United States Patent
Lee et al.

(10) Patent No.: US 11,290,155 B2
(45) Date of Patent: Mar. 29, 2022

(54) METHOD AND APPARATUS FOR TRANSMITTING AND RECEIVING FEEDBACK INFORMATION

(71) Applicant: LG ELECTRONICS INC., Seoul (KR)

(72) Inventors: Hojae Lee, Seoul (KR); Gwanmo Ku, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 16/756,836

(22) PCT Filed: Oct. 17, 2018

(86) PCT No.: PCT/KR2018/012241
§ 371 (c)(1),
(2) Date: Apr. 16, 2020

(87) PCT Pub. No.: WO2019/078607
PCT Pub. Date: Apr. 25, 2019

(65) Prior Publication Data
US 2020/0244319 A1    Jul. 30, 2020

Related U.S. Application Data

(60) Provisional application No. 62/573,644, filed on Oct. 17, 2017.

(51) Int. Cl.
*H03D 3/22* (2006.01)
*H04B 7/0417* (2017.01)
(Continued)

(52) U.S. Cl.
CPC ......... *H04B 7/0417* (2013.01); *H04B 7/0632* (2013.01); *H04B 17/336* (2015.01)

(58) Field of Classification Search
CPC ... H04B 7/0417; H04B 17/336; H04B 7/0632
(Continued)

(56) References Cited

U.S. PATENT DOCUMENTS 8,605,610 B2    12/2013    Hwang
2009/0109909 A1    4/2009    Onggosanusi et al.
(Continued)

FOREIGN PATENT DOCUMENTS

KR    1020160102322    8/2016
WO    2013140782    9/2013

OTHER PUBLICATIONS

PCT International Application No. PCT/KR2018/0012241, Written Opinion of the International Searching Authority dated Feb. 18, 2019, 28 pages.

*Primary Examiner* — Zewdu A Kassa
(74) *Attorney, Agent, or Firm* — Lee, Hong, Degerman, Kang & Waimey PC

(57) ABSTRACT

A method for transmitting feedback information by a terminal may comprise the steps of: receiving, from a base station, information on a feedback group allocated to the terminal in a predefined feedback table; selecting a first feedback index in the allocated feedback group; and transmitting feedback information including the selected first feedback index to the base station, wherein the feedback table includes a plurality of feedback groups, the plurality of feedback groups in the feedback table include predetermined number of feedback indices, respectively, and the plurality of feedback groups in the feedback table have differently configured quantization level resolutions for the feedback information, respectively.

16 Claims, 5 Drawing Sheets

(51) Int. Cl.
*H04B 17/336* (2015.01)
*H04B 7/06* (2006.01)
(58) Field of Classification Search
USPC .................................. 375/329, 316, 219, 295
See application file for complete search history.

(56) References Cited

U.S. PATENT DOCUMENTS

2009/0245408 A1 10/2009 Mujtaba et al.
2014/0044069 A1* 2/2014 Bao ..................... H04B 7/0689
370/329

* cited by examiner

METHOD AND APPARATUS FOR TRANSMITTING AND RECEIVING FEEDBACK INFORMATION

CROSS-REFERENCE TO RELATED APPLICATIONS

This application is the National Stage filing under 35 U.S.C. 371 of International Application No. PCT/KR2018/012241, filed on Oct. 17, 2018, which claims the benefit of U.S. Provisional Application No. 62/573,644, filed on Oct. 17, 2017 the contents of which are all hereby incorporated by reference herein in their entirety.

TECHNICAL FIELD

The present disclosure relates to wireless communications, and more particularly, to a method of transmitting and receiving feedback information and apparatus therefor.

BACKGROUND ART

In LTE system, 5G NR system and the like, feedback channels exist between a multitude of user equipments and a base station and are defined in various ways according to the objects of feedback. And, Channel Quality Indicator (CQI) feedback is defined as follows.

CQI index and interpretation for reporting CQI based on QPSK, 16QAM and 64QAM are illustrated in table 1.

TABLE 1

| CQI Index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

DISCLOSURE

Technical Task

One technical task of the present disclosure is to provide a method of transmitting feedback information by a User Equipment (UE).

Another technical task of the present disclosure is to provide a method of receiving feedback information by a Base Station (BS).

Further technical task of the present disclosure is to provide a user equipment transmitting feedback information.

Another further technical task of the present disclosure is to provide a base station receiving feedback information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to one embodiment, a method of transmitting feedback information by a user equipment may include receiving information on a feedback group allocated to the user equipment in a predefined feedback table from a base station, selecting a first feedback index from the allocated feedback group, and transmitting feedback information including the selected first feedback index to the base station, wherein the feedback table may include a plurality of feedback groups, wherein each of a plurality of the feedback groups in the feedback table may include a prescribed number of feedback indexes, and wherein a plurality of the feedback groups in the feedback table may be set to differ from each other in a resolution of quantization levels for the feedback information.

The selecting the feedback index may include selecting the feedback index from the feedback group based on a received Signal-to-Noise Ratio (SNR) for a signal received from the base station. The feedback groups in the feedback table may have different quantization level numbers, respectively.

The method may further include receiving an additional feedback request from the base station, selecting a prescribed second feedback index connected to a resolution of quantization levels owned by the selected feedback index from a higher feedback group having the quantization level number greater than that of the allocated feedback group based on the additional feedback request, and transmitting additional feedback information including the second feedback index selected from the higher feedback group to the base station. The feedback information may include Channel Quality Information (CQI) and the feedback index may include a CQI index.

According to another embodiment, a method of receiving feedback information by a base station may include grouping feedback groups in a feedback table predefined for a plurality of user equipments, transmitting information on the feedback groups allocated to a plurality of the user equipments to a plurality of the user equipments based on the grouping, respectively, and receiving feedback information including a selected feedback index from each of a plurality of the user equipments, wherein the feedback table may include a plurality of feedback groups, wherein each of a plurality of the feedback groups in the feedback table may include a prescribed number of feedback indexes, and wherein a plurality of the feedback groups in the feedback table may be set to differ from each other in a resolution of quantization levels for the feedback information.

The method may further include selecting a user equipment having transmitted a highest feedback index based on the feedback information received from each of a plurality of the user equipments, if the selected user equipment does not belong to a feedback group having a greatest quantization level number, transmitting an additional feedback request to the user equipment, and receiving additional feedback information from the selected user equipment. The method feedback groups in the feedback table may have different quantization level numbers, respectively. The grouping may be performed based on an extent that the feedback information varies for each of a plurality of the user equipments. The feedback information may include Channel Quality Information (CQI) and wherein the feedback index includes a CQI index.

According to another embodiment, a user equipment transmitting feedback information may include a receiver receiving information on a feedback group allocated to the user equipment in a predefined feedback table from a base station, a processor selecting a first feedback index from the allocated feedback group, and a transmitter transmitting feedback information including the selected first feedback index to the base station, wherein the feedback table may include a plurality of feedback groups, wherein each of a plurality of the feedback groups in the feedback table may include a prescribed number of feedback indexes, and wherein a plurality of the feedback groups in the feedback table may be set to differ from each other in a resolution of quantization levels for the feedback information.

The processor may select the feedback index from the feedback group based on a received Signal-to-Noise Ratio (SNR) for a signal received from the base station. The receiver may receive an additional feedback request from the base station, the processor may select a prescribed second feedback index connected to a resolution of quantization levels owned by the selected feedback index from a higher feedback group having the quantization level number greater than that of the allocated feedback group based on the additional feedback request, and the transmitter may transmit additional feedback information including the second feedback index selected from the higher feedback group to the base station.

According to another embodiment, a base station receiving feedback information may include a processor grouping feedback groups in a feedback table predefined for a plurality of user equipments, a transmitter transmitting information on the feedback groups allocated to a plurality of the user equipments to a plurality of the user equipments based on the grouping, respectively, and a receiver receiving feedback information including a selected feedback index from each of a plurality of the user equipments, wherein the feedback table may include a plurality of feedback groups, wherein each of a plurality of the feedback groups in the feedback table may include a prescribed number of feedback indexes, and wherein a plurality of the feedback groups in the feedback table may be set to differ from each other in a resolution of quantization levels for the feedback information.

The processor may select a user equipment having transmitted a highest feedback index based on the feedback information received from each of a plurality of the user equipments. If the selected user equipment does not belong to a feedback group having a greatest quantization level number, the transmitter may transmit an additional feedback request to the user equipment. And, the receiver may receive additional feedback information from the selected user equipment.

Advantageous Effects

According to an embodiment of the present disclosure, feedback executions by a multitude of user equipments based on heterogeneous resolution may reduce a dieback information size.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

Figure 1:
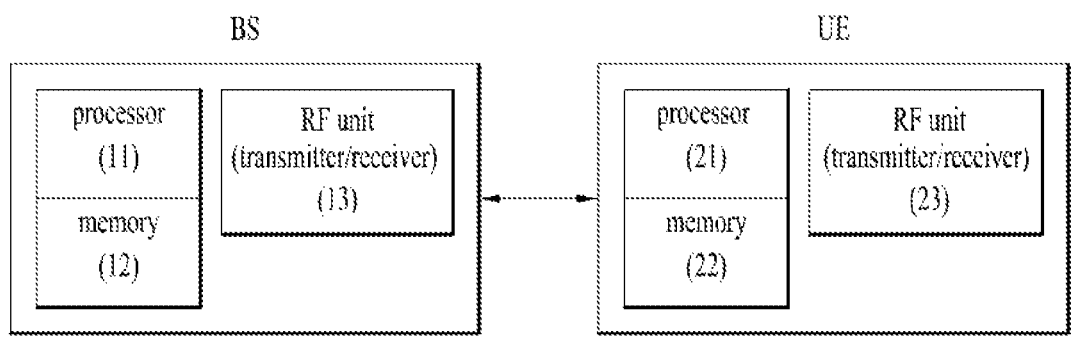
FIG. 1 is a diagram illustrating a wireless communication system for implementing the present disclosure.

Hereinafter, preferred embodiments of the present disclosure will be described in detail with reference to the accompanying drawings. The detailed description set forth below in connection with the accompanying drawings is intended to describe an exemplary embodiment of the present disclosure and is not intended to represent the only embodiment in which the present disclosure may be implemented. The following detailed description includes specific details for the purpose of providing a thorough understanding of the present disclosure. It will be apparent, however, to those skilled in the art, that the present disclosure may be implemented without these specific details. For example, the following detailed description is specifically described assuming that the mobile communication system is 3GPP LTE system or LTE-A system, but is applicable to any other mobile communication system except for the specific features of 3GPP LTE/LTE-A.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

In addition, in the following description, it is assumed that a terminal is a mobile or fixed user stage device such as a User Equipment (UE), a Mobile Station (MS), an Advanced Mobile Station (AMS), and the like. Besides, it is assumed that a base station refers to any node of a network stage in communication with a terminal, such as a Node B, an eNode B, a Base Station (BS), an Access Point (AP), a gNode B (gNB), and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following technologies may be used in a variety of wireless access systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), 5G communication system, and the like. CDMA may be implemented in a radio technology such as Universal Terrestrial Radio Access (UTRA) or CDMA2000.TDMA may be implemented in wireless technology such as Global System for Mobile Communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802-20, Evolved UTRA (E-UTRA), and the like. UTRA is part of a Universal Mobile Telecommunications System (UMTS). $3^{rd}$ Generation Partnership Project (3GPP) Long Term Evolution (LTE) employs OFDMA in downlink as a part of an Evolved UMTS (E-UMTS) that uses E-UTRA and SC-FDMA in uplink. LTE-A (Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Considering the feedback purpose of multiple UEs, a scheme such as Heterogeneous Source Coding may be applied that transforms and transmits feedback in the form of information that is consistent with the purpose. A heterogeneous source coding intends to reduce the amount of feedback information by differentiating an encoding scheme of feedback information between multiple UEs. However, the feedback information amount of each user (hereinafter, a user refers to as a User Equipment (UE)) may not be determined as an integer. In order to reduce the amount of feedback information, the amount of information must be reduced by joint-encoding feedback on a multitude of bands. For example, in 2-user case, a UE 1 (UE1) may reduce 4-bit feedback to 3-bit feedback, but a UE 2 (UE2) may combine feedback on two or more subbands or bands with 3.125 bits to obtain a feedback gain of 1 bit.

A technology for reducing the amount of information of CQI feedback considered in an LTE system or a 5G NR system may be required. In particular, if CQI feedbacks on multiple subbands are considered, respectively, the corresponding information amount may be converted to a number of information bits. To this end, the above-mentioned Heterogeneous Source Coding may be considered, but joint encoding for multiple subbands may need to be considered. Therefore, the present disclosure intends to propose a method of efficiently reducing the amount of information without joint encoding on multiple bands or subbands on the basis of heterogeneous resolution.

Proposal 1: Heterogeneous Resolution Based Feedback Mechanism

The present disclosure intends to propose a method for setting a resolution of feedback of multiple users differently based on heterogeneous resolution. In the present disclosure, assumed is an environment that a random feedback level is agreed with each other between a single or multiple transmitting sides (UE) and a single or multiple receiving side (BS). The feedback level may be quantized on a specific condition as follows. For example, in an LTE system, CQI metric level may be determined by a region of a received SNR as follows.

TABLE 2

| CQI | SNR Transmission Mode | | | | |
|---|---|---|---|---|---|
| | 111, 0 re-tx | 111, 3 re-tx | 222 | 322 | 342 |
| 1 | 1.95 | 2.00 | −7.00 | −3.10 | −4.80 |
| 2 | 4.00 | 4.05 | −5.00 | −1.15 | −2.60 |
| 3 | 6.00 | 5.10 | −3.15 | 1.50 | 0.00 |
| 4 | 8.00 | 8.00 | −1.00 | 4.00 | 2.60 |
| 5 | 10.00 | 10.00 | 1.00 | 6.00 | 4.95 |
| 6 | 11.95 | 11.80 | 3.00 | 8.90 | 7.60 |
| 7 | 14.05 | 13.90 | 5.00 | 12.70 | 10.60 |
| 8 | 16.00 | 16.10 | 6.90 | 14.90 | 12.95 |
| 9 | 17.90 | 17.45 | 8.90 | 17.50 | 15.40 |
| 10 | 19.90 | 19.50 | 10.85 | 20.50 | 18.10 |
| 11 | 21.50 | 21.50 | 12.60 | 22.45 | 20.05 |
| 12 | 23.45 | 23.10 | 14.35 | 23.20 | 22.00 |
| 13 | 25.00 | 24.90 | 16.15 | 24.90 | 24.55 |
| 14 | 27.30 | 27.00 | 18.15 | 27.00 | 26.80 |
| 15 | 29.00 | 29.10 | 20.00 | 29.10 | 29.60 |

In Table 2, transmission modes may be categorized as follows.
- 111 Tx Mode 0 re-tx: TM1, Number of Tx Antenna=1, Number of Rx Antenna=1, HARQ Max retransmission=0
- 111 Tx Mode 3 re-tx: TM1, Number of Tx Antenna=1, Number of Rx Antenna=1, HARQ Max retransmission=3
- 222 Tx Mode: TM2, Number of Tx Antenna=2, Number of Rx Antenna=2
- 322 Tx Mode: TM3, Number of Tx Antenna=2, Number of Rx Antenna=2
- 342 Tx Mode: TM3, Number of Tx Antenna=4, Number of Rx Antenna=2

In the present disclosure, the resolution of a quantization level may be set differently for each group or user, and is represented as a group in the following for clarity of description. Quantization level difference per group may be set in the same manner as Table 3.

TABLE 3

| Conv. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Group 1 | 1 | 2 | 3 | 4 | 5 | 6 | 7 | 8 | 9 | 10 | 11 | 12 | 13 | 14 | 15 | 16 |
| Group 2 | | 1.5 | | 3.5 | | 5.5 | | 7.5 | | 9.5 | | 11.5 | | 13.5 | | 15.5 |
| Group 3 | | | | 2.5 | | | | 6.5 | | | | 10.5 | | | | 14.5 |

When the quantization level is 16, Group 1 uses the indexes for 16 quantization levels as they are. Group 2, on the other hand, defines new indexes for 8 quantization levels. Here, the index 1.5 of the Group 2 means a value greater than the index 1 of Group 1, which is the existing 16 quantization levels, and smaller than the index 2 thereof. However, in terms of information before quantization (e.g., SNR (Signal to Noise Ratio) region for CQI indexing), both of the region of index 1 and the region of index 2 in Groups 1 are quantized to the index 1.5 of Group 2. For example, the CQI level of the LTE system may be newly defined according to the region of the received SNR according to Group as shown in Table 4 (for clarity of explanation, only 111, 0 re-tx mode is described).

TABLE 4

| Group 1 Quantization Index | SNR | Group 2 Quantization Index | SNR | Group 3 Quantization Index | SNR |
|---|---|---|---|---|---|
| 1 | 1.95 | 1.5 | 3.00 | 2.5 | 5.00 |
| 2 | 4.00 | | | | |
| 3 | 6.00 | 3.5 | 7.00 | | |
| 4 | 8.00 | | | | |
| 5 | 10.00 | 5.5 | 11.00 | 6.5 | 13.00 |
| 6 | 11.95 | | | | |
| 7 | 14.05 | 7.5 | 15.00 | | |
| 8 | 16.00 | | | | |
| ... | ... | ... | ... | ... | ... |

Namely, according to the interpretation from the perspective of CQI level, when a UE of each group selects a CQI level closest to a received SNR value, it selects a group quantization index matched to a closest SNR value. For example, if the received SNR of a user of Group 2 is 3.5, the closest Group 2 quantization index 1.5 is selected. That is, if Received SNR<5, then the Group 2 quantization index 1.5 is selected. If 5≤Received SNR<9, the Group 2 quantization index 3.5 is selected. That is, the SNR region may be different due to the quantization resolution difference. The SNR region in the above example may be set differently depending on a system environment.

That is, if a group is allocated to a UE by an RRC step or a periodic control signaling (described in Proposal 3 below), the UE selects a quantization index closest to its Received SNR based on the group indexes in Table 4.

The feedback level according to the above group can then be mapped to bits as follows.

TABLE 5

| Group 1 Quantization Index | Binary Expression (4 bits) | Group 2 Quantization Index | Binary Expression (3 bits) | Group 3 Quantization Index | Binary Expression (2 bits) |
|---|---|---|---|---|---|
| 1 | 0000 | 1.5 | 000 | 2.5 | 00 |
| 2 | 0001 | | | | |
| 3 | 0010 | 3.5 | 001 | | |
| 4 | 0011 | | | | |
| 5 | 0100 | 5.5 | 010 | 6.5 | 01 |
| 6 | 0101 | | | | |

TABLE 5-continued

| Group 1 Quantization Index | Binary Expression (4 bits) | Group 2 Quantization Index | Binary Expression (3 bits) | Group 3 Quantization Index | Binary Expression (2 bits) |
|---|---|---|---|---|---|
| 7 | 0110 | 7.5 | 011 | | |
| 8 | 0111 | | | | |
| ... | ... | ... | ... | ... | ... |

A UE may feed back binary expression according to the mapping rule of Table 5 based on the quantization index selected by the above operation. At this time, a container size of feedback may be different per group. For example, it may be defined as a different xPUCCH format (described in Proposal 3 below).

Using the heterogeneous resolution based feedback mechanism described above, the following characteristics may be obtained.
- Resolution Group 1 uses an existing feedback table in which CQI ambiguity and ordering ambiguity do not occur.
- Resolution Group 2 uses a feedback table that generates 1-bit CQI ambiguity (ambiguity for SNR region) but does not generate ordering ambiguity (ambiguity for selecting a user having a greater SNR value among multiple users). 2 Layer (case that Resolution Groups 1 and 2 exist only) does not generate ordering ambiguity, so there is no system performance loss due to ordering, but the amount of feedback reduction is small. In order to recognize the exact SNR region of Group 2, additional feedback of 1 bit may be necessary and a corresponding delay may occur.
- Resolution Group 3 uses a feedback table that generates 2-bit CQI ambiguity and causes ordering ambiguity. 3 Layer causes ordering ambiguity, so that the system performance for ordering may be possibly reduced, but the amount of feedback reduction is considerable. In order to recognize the exact SNR region of Group 3, 2-bit additional feedback may be required, and a corresponding delay may be occur.

For the heterogeneous resolution-based feedback mechanism proposed above, a receiving side (e.g., base station) may interpret it in the following manner. The following Table 6 illustrates a case that there are two resolution groups.

TABLE 6

| Group 1 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Group 2 | | 1.5 | | 3.5 | | 5.5 | | 7.5 | | 9.5 | | 11.5 | | 13.5 | | 15.5 |

The details of the two resolution groups are described below with reference to Table 6.

A base station selects a user or users who have sent the highest index based on information fed back from multiple users (or UEs) in each group (or resolution group). For example, if a UE 1_1 (a first UE of Group 1) of Group 1 feeds back an index 2 to the base station and a UE 1_2 of Group 1 (a second UE of Group 1) feeds an index 1 back to the base station, the base station selects the UE 1_1 from Group 1.

A base station compares feedback indexes from multiple users selected from each group and then selects a user or users who have sent the highest index. For example, the base station compares an index 2 of UE 1_1 selected from Group 1 with an index 1.5 of UE 2_3 (a third UE of Group 2) selected from Group 2 and then selects the UE 1_1 of Group 1 having a greater index. For example, the base station compares an index 2 of the UE 1_1 selected from Group 1 and an index 3.5 of UE 2_4 (the fourth UE of Group 2) selected from Group 2 and then selects the UE 2_4 of Group 2 having a greater index.

Through this operation, if a finally selected user has feedback ambiguity (or CQI ambiguity) (i.e., case that it is not Group 1), [Alternative 1] a receiving side (base station) makes a request for a 1-bit additional feedback to the selected user or a transmitting side (UE) having received an additional feedback request sends information corresponding to the higher resolution of Group 1 to the receiving side, thereby solving the feedback ambiguity. That is, the UE 2_4, which in the above example fed back the index 3.5, performs 1-bit feedback using whether it is closer to which one of further detailed SNR regions of 3 and 4 of Group 1 matching (or corresponding to) the index 3.5 or with 0 or 1. After receiving the 1-bit additional feedback, the receiving side interprets it as the SNR Region of Group 1.

[Alternative 2] The receiving side recognizes the SNR region corresponding to the group without making a request for 1-bit additional feedback to the selected user.

Table 7 illustrates the case that there are three resolution groups.

TABLE 7

| Group 1 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Group 2 | | 1.5 | | 3.5 | | 5.5 | | 7.5 | | 9.5 | | 11.5 | | 13.5 | | 15.5 |
| Group 3 | | | 2.5 | | | | 6.5 | | | | 10.5 | | | | 14.5 | |

Referring to Table 7, the matters of two resolution groups are described.

A base station selects a user or users having sent the highest index based on information fed back from multiple users in each group. For example, if UE 1_1 of Group 1 feeds an index 2 back to a base station and UE 1_2 of Group 1 feeds an index 1 back to the base station, the base station selects the UE 1_1 from Group 1.

A base station compares feedback indexes from multiple users selected from each group and then selects a user or users having sent the highest index. For example, the base station compares an index 3 of UE 1_1 selected from Group 1, an index 1.5 of UE 2_3 selected from Group 2, and an index 2.5 of UE 3_5 selected from Group 3 with each other, thereby selecting the UE 1_1 of Group 1 having the greatest index. For example, the base station compares an index 3 of UE 1_1 selected from Group 1, an index 3.5 of UE 2_4 selected from Group 2, and an index 2.5 of UE 3_5 selected from Group 3 with each other, thereby selecting the UE 2_4 of Group 2 having the greatest index. For example, the base station compares an index 2 of UE 1_1 selected from Group 1, an index 1.5 of UE 2_3 selected from Group 2, and an index 2.5 of UE 3_5 selected from Group 3 with each other, thereby selecting the UE 3_5 of Group 3 having the greatest index.

Through the above operation, when the finally selected user has the feedback ambiguity (or CQI ambiguity), in case of corresponding to Group 2, interpretation is made by performing or not performing additional feedback as a method of solving feedback ambiguity if two resolution groups exist.

Through the above operation, when the finally selected user has the feedback ambiguity (or CQI ambiguity), in case of corresponding to Group 3, as Alternative 1), a receiving side (BS) makes a request for 1-bit additional feedback to the selected user. A UE (a transmitting side) having received the request for the additional feedback sends information corresponding to higher resolution of Group 2, thereby solving the feedback ambiguity. Namely, the UE 3_5 having fed back the index 2.5 in the above example performs 1-bit feedback using whether it is closer to which one of further detailed SNR regions of 1.5 and 3.5 of Group 2 matching or corresponding to the index 2.5 or with 0 or 1. After receiving the 1-bit additional feedback, the receiving side interprets it as the SNR Region of Group 2. In this case, the receiving side may re-compare the value interpreted as the SNR region of Group 2 with users selected from the existing Group 1 and the existing Group 2.

As Alternative 2), a receiving side (BS) makes a request for 2-bit additional feedback to the selected user. A transmitting side having received the request for the additional feedback sends information corresponding to higher resolution of Group 1, thereby solving the feedback ambiguity. Namely, the UE 3_5 having fed back the index 2.5 in the above example performs 2-bit feedback using whether it is closer to which one of further detailed SNR regions of 1. 2. 3 and 4 of Group 1 matching or corresponding to the index 2.5 or with 00, 01, 10 or 11. After receiving the 2-bit additional feedback, the receiving side interprets it as the SNR Region of Group 1. In this case, the receiving side may re-compare the value interpreted as the SNR region of Group 1 with users selected from the existing Group 1 and the existing Group 2.

As Alternative 3), a receiving side does not make a request for 1- or 2-bit additional feed back to the selected user but recognizes SNR resolution corresponding to group.

A case that four resolution groups exist may be applied and interpreted in a manner similar to the methods described for the cases of presences of 1, 2 and 3 resolution groups.

The above-described interpretation method of the receiving side may be variously applicable according to the behaviors made by the receiving side based on the fed-back information. For example, in case that a receiving side (BS) uses it for the scheduling of DL/UL to a transmitting side (UE), a scheduling operation may be performed in a manner of being combined with Que information for DL/UL, data rate information for proportional fairness and the like as well as CQI information. In this case, the receiving side may estimate an SNR region based on the fed-back index and combine it with other information. Or, the receiving side may be interpreted as different from the above description by an interpretation method required for D2D link setup and minimum QoS setup for and multicast/broadcast.

Proposal 2: Heterogeneous Resolution-Based Feedback Mechanism with Heterogeneous Source Coding Proposal 2 according to the present disclosure intends to propose a method of applying heterogeneous source coding while setting a resolution of feedback of multiple users (or UEs) based on a heterogeneous resolution.

In the present disclosure, resolution and encoding method of quantization levels may be set different per group or user and is represented as a group below for clarity of description. A quantization level different per group may be set by the following scheme as Table 8.

TABLE 8

| Conv. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Group 1 | 1 | 2 | 3 | 4 | 5 | 6 | 7 | 8 | 9 | 10 | 11 | 12 | 13 | 14 | 15 | 16 |
| Group 2_1 | | 1.5 | | 3.5 | | 5.5 | | 7.5 | | 9.5 | | 11.5 | | 13.5 | | 15.5 |
| Group 2_2 | 1 | | 2.5 | | 4.5 | | 6.5 | | 8.5 | | 10.5 | | 12.5 | | 14.5 | 16 |
| Group 3_1 | | | 2.5 | | | | 6.5 | | | | 10.5 | | | | 14.5 | |
| Group 3_2 | | 1.5 | | | 4.5 | | | | 8.5 | | | | 12.5 | | | 15.5 |

Assuming that there exist 16 quantization levels, Group 1 uses indexes for 16 quantization levels as they are. On the other hand, Group 2_1 defines new indexes at 8 quantization levels. Here, an index 1.5 of Group 1 means a value greater than an index 1.5 of Group 1, which is the existing 16 quantization levels, and smaller than an index 2 thereof. Yet, from the perspective of the information (e.g., SNR region for CQI indexing) before quantization, both a region of the index 1 of Group 1 and a region of the index 2 are quantized into an index 1.5 of Group 2_1. Group 2_2 defines new indexes at 9 quantization levels. Here, indexes 1 and 16 of Group 2_2 are equal to indexes 1 and 16 of Group 1, but 2.5 means a value greater than an index 2 and smaller than an index 3 of Group 1 that is the existing 16 quantization levels. Yet, from the perspective of the information (e.g., SNR region for CQI indexing) before quantization, both a region of the index 2 of Group 1 and a region of the index 3 are quantized into an index 2.5 of Group 2_2. In the same manner, Group 3_1 defines 4 new quantization levels. In the same manner, Group 3_2 defines 5 new quantization levels.

For example, CQI level of the legacy LTE may be newly defined according to a region of a received SNR depending on a group like Table 9. (For clarity of description, 111 and 0 re-tx modes are described only.)

TABLE 9

| Group 1 Quantization Index | SNR | Group 2_1 Quantization Index | SNR | Group 2_2 Quantization Index | SNR | Group 3_1 Quantization Index | SNR | Group 3_2 Quantization Index | SNR |
|---|---|---|---|---|---|---|---|---|---|
| 1 | 1.95 | 1.5 | 3.00 | 1 | 1.95 | 2.5 | 5.00 | 1.5 | 3.00 |
| 2 | 4.00 | | | 2.5 | 5.00 | | | | |
| 3 | 6.00 | 3.5 | 7.00 | | | | | 4.5 | 9.00 |
| 4 | 8.00 | | | 4.5 | 9.00 | | | | |
| 5 | 10.00 | 5.5 | 11.00 | | | 6.5 | 13.00 | | |
| 6 | 11.95 | | | 6.5 | 13.00 | | | | |

TABLE 9-continued

| Group 1 Quantization Index | SNR | Group 2_1 Quantization Index | SNR | Group 2_2 Quantization Index | SNR | Group 3_1 Quantization Index | SNR | Group 3_2 Quantization Index | SNR |
|---|---|---|---|---|---|---|---|---|---|
| 7 | 14.05 | 7.5 | 15.00 | | | | | 8.5 | 17.00 |
| 8 | 16.00 | | | 8.5 | 17.00 | | | | |
| 9 | 17.90 | 9.5 | 18.90 | | | ... | ... | | |
| 10 | 19.90 | | | ... | ... | | | | |
| ... | ... | ... | ... | | | | | ... | ... |

Namely, according to interpretation from the perspective of CQI level, when a UE of each group selects a CQI level closest to a received SNR value, it selects a group quantization index that matches a closest SNR value. For example, if a received SNR of a user of Group 2_1 is 3.5, a closest Group 2_1 quantization index 1.5 is selected. Namely, if Received SNR<5, a Group 2_1 quantization index 1.5 is selected. If 5≤Received SNR<9, a Group 2_1 quantization index 3.5 is selected. On the other hand, if a received SNR of a user of Group 2_2 is 3.5, a closest Group 2_2 quantization index 2.5 is selected. Namely, if Received SNR<3, a Group 2_2 quantization index 1 is selected. If 3≤Received SNR<7, a Group 2_2 quantization index 2.5 is selected. Namely, an SNR region may differ due to a quantization resolution difference. The above-exampled SNR region may be set different according to a system environment.

Namely, if a UE receives allocation of a group by RRC step or periodic control signaling (described in Proposal 3 below), it selects a quantization index closest to a received SNR of its own based on the group indexes in the above table. If so, a feedback level according to the group may be mapped into bits like Table 10 below.

Considering the heterogeneous source coding in a heterogeneous resolution based feedback mechanism, there are properties as follows.

Resolution Group 1 uses an existing feedback table in which CQI ambiguity and ordering ambiguity do not occur.

Resolution Group 2_1 uses a feedback table in which ordering ambiguity (i.e., ambiguity on an SNR region) does not occur despite that 1-bit CQI ambiguity (i.e., ambiguity on selecting a user having a greater SNR value from multiple users) occurs. As 2 Layer (i.e., a case that Resolution Group 1 and Group 2_1 exist only) does not generate ordering ambiguity, there is no system performance loss caused by ordering but there is a small feedback reduction amount. To recognize an accurate SNR region of Group 2_1, 1-bit additional feedback may be required, whereby a delay for it may be generated.

Resolution Group 2_2 uses a feedback table in which 1-bit CQI ambiguity (i.e., ambiguity on an SNR region) occurs but ordering ambiguity (i.e., ambiguity on selecting a user having a greater SNR value from

TABLE 10

| Group 1 Quantization Index | Binary Expression (4 bits) | Group 2_1 Quantization Index | Binary Expression (3 bits) | Group 2_2 Quantization Index | Binary Expression (>3 bits) | Group 3_1 Quantization Index | Binary Expression (2 bits) | Group 3_2 Quantization Index | Binary Expression (>2 bits) |
|---|---|---|---|---|---|---|---|---|---|
| 1 | 0000 | 1.5 | 000 | 1 | 000 | 2.5 | 00 | 1.5 | 00 |
| 2 | 0001 | | | 2.5 | 001 | | | | |
| 3 | 0010 | 3.5 | 001 | | | | | 4.5 | 01 |
| 4 | 0011 | | | 4.5 | 010 | | | | |
| 5 | 0100 | 5.5 | 010 | | | 6.5 | 01 | | |
| 6 | 0101 | | | 6.5 | 011 | | | | |
| 7 | 0110 | 7.5 | 011 | | | | | 8.5 | 10 |
| 8 | 0111 | | | 8.5 | 100 | | | | |
| 9 | 1000 | 9.5 | 100 | | | ... | ... | | |
| 10 | 1001 | | | ... | ... | | | | |
| ... | ... | ... | ... | | | | | ... | ... |

In Table 10, when represented by binary expression, Group 2_2 and Group 3_2 may have quantization levels over 3 bits and 2 bits. Hence, it is necessary to define and use a rule of joint-encoding a multitude of feedbacks (e.g., CQI feedbacks on a multitude of subbands). Or, it is necessary to reduce a feedback information amount by an additional source coding scheme (e.g., entropy coding), etc. Or, feedback may be performed in a manner of not reducing the feedback information amount into 4 bits and 3 bits without an additional encoding scheme.

Namely, a UE feeds binary expression back to a BS according to a mapping rule of Table 10 based on a quantization index selected by the above operation. In this case, a container size of feedback may be different per group. For example, it may be defined in a different xPUCCH format (described in Proposal 3 below).

multiple users) does not occur. Quantization indexes 1 and 16 do not generate CQI ambiguity. As 3 Layer (i.e., a case that Resolution Group 1, Group 2_1 and Group 2_2 exist only) does not generate ordering ambiguity, there is no system performance loss caused by ordering but there is a small feedback reduction amount. To recognize an accurate SNR region of Group 2_2, additional feedback may be unnecessary or 1-bit additional feedback may be required, whereby a delay for it may be generated.

Resolution Group 3_1 uses a feedback table in which 2-bit CQI ambiguity occurs and ordering ambiguity is caused. As ordering ambiguity is caused from 4 Layer and so on, system performance on ordering may be reduced but a feedback reduction amount is considerable. To recognize an accurate SNR region of Group 3, 2-bit additional feedback may be necessary, whereby a delay for it may be generated.

Resolution Group 3_2 uses a feedback table in which 2-bit CQI ambiguity occurs and ordering ambiguity is caused. Quantization indexes 1.5 and 15.5 generate 1-bit CQI ambiguity only. As ordering ambiguity is caused from 4 Layer and so on, system performance on ordering may be reduced but a feedback reduction amount is considerable. To recognize an accurate SNR region of Group 3_2, 1- or 2-bit additional feedback may be necessary, whereby a delay for it may be generated.

For the heterogeneous resolution based feedback mechanism proposed and described above, a receiving side may make interpretation in a manner similar to Proposal 1. Yet, the following inter-resolution ambiguity may occur.

TABLE 11

| Conv. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Group 1 | 1 | 2 | 3 | 4 | 5 | 6 | 7 | 8 | 9 | 10 | 11 | 12 | 13 | 14 | 15 | 16 |
| Group 2_1 | 1.5 | | 3.5 | | 5.5 | | 7.5 | | 9.5 | | 11.5 | | 13.5 | | 15.5 | |
| Group 2_2 | 1 | 2.5 | | 4.5 | | 6.5 | | 8.5 | | 10.5 | | 12.5 | | 14.5 | | 16 |
| Group 3_1 | | 2.5 | | | | 6.5 | | | | 10.5 | | | | 14.5 | | |
| Group 3_2 | 1.5 | | | 4.5 | | | | 8.5 | | | | 12.5 | | | 15.5 | |

Referring to Table 11, when inter-resolution ambiguity occurs, it may be solved by selecting a higher group (e.g., Group 3_1 or Group 3_2) and performing additional feedback.

Additional feedback 1-bit case of Group 3_1 (additional feedback is feedback with resolution of Group 2_1)

A final selection is made by comparison with Group 2_2. For example, in case of Group 2_1 reference 1.5, 2.5 of Group 2_2 is selected (or wins). For example, in case of Group 2_1 reference 3.5, 2.5 of Group 2_2 loses.

Additional feedback 2-bit case of Group 3_1 (additional feedback is feedback with Group 1)

A final selection is made by comparison with Group 2_2. For example, in case of Group 1 reference 1, 1.5 of Group 2_1 wins and 2.5 of Group 2_2 wins. In case of Group 1 reference 2, 2.5 of Group 2_1 loses and 2.5 of Group 2_2 wins. In case of Group 1 reference 3 or 4, 2.5 of Group 2_2 loses.

When inter-resolution ambiguity occurs, additional feedback of Group 3_2 may be operated and interpreted in the same manner.

The above-described interpretation method of the receiving side may be applicable variously according to a behavior based on information fed back to the receiving side. For example, when a base station uses it for scheduling of DL/UL link to a UE, a scheduling operation may be performed by being combined with Que information for DL/UL, data rate information for proportional fairness and the like as well as CQI information. In this case, an SNR region is estimated based on a fed-back index and may be combined with other information above. Or, it may be interpreted as different from the above description by an interpretation method required for D2D link setup and minimum QoS setup for and multicast/broadcast.

Proposal 3: Signaling for Heterogeneous Resolution Based Feedback Mechanism

The present disclosure intends to propose signaling for operating the heterogeneous resolution based feedback mechanism proposed in Proposal 1 and Proposal 2.

Figure 2:
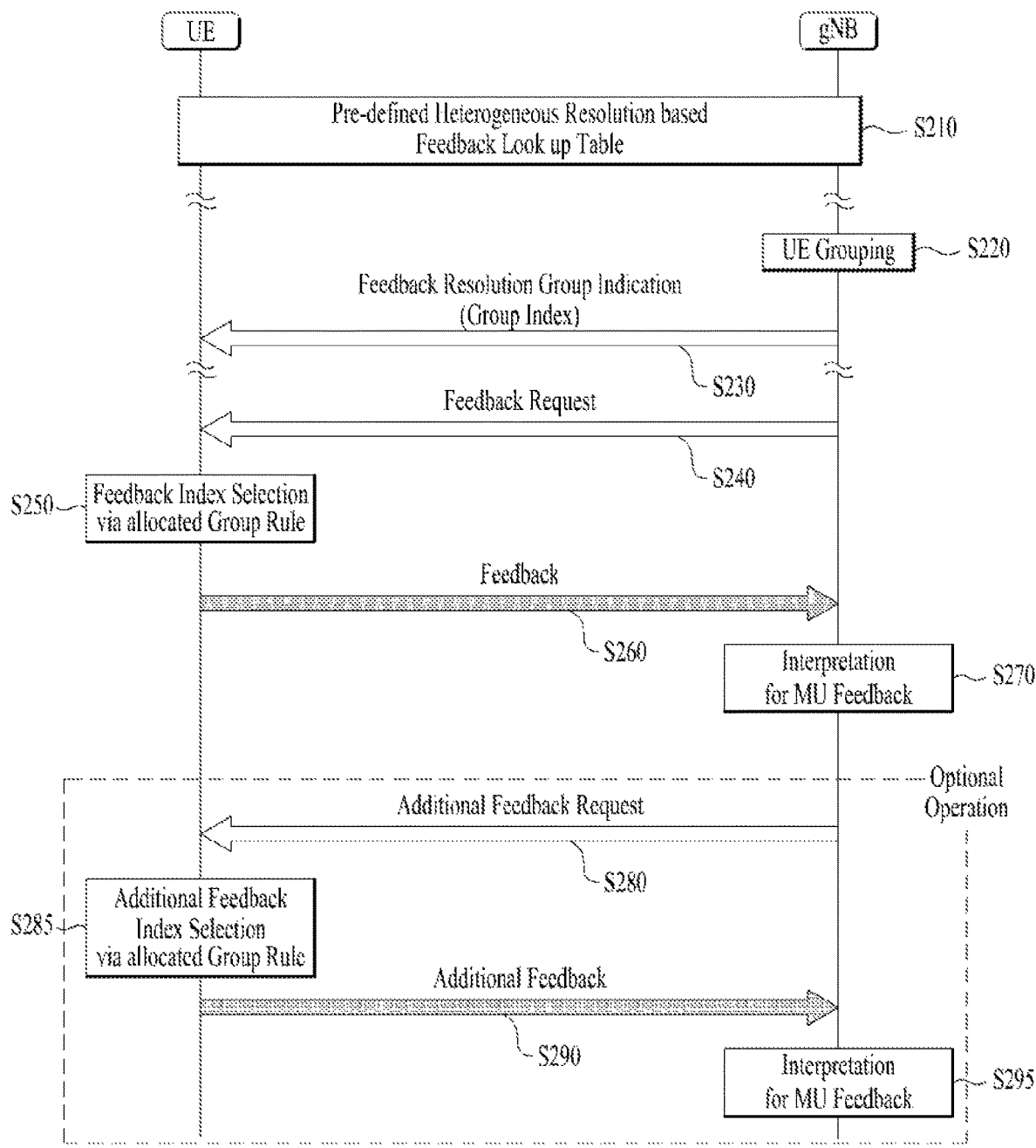
FIG. 2 is a diagram showing an example of a whole signal flow between transmitting and receiving sides for an operation of Proposal 1 or Proposal 2.

FIG. 2 is a diagram showing an example of a whole signal flow between transmitting and receiving sides for an operation of Proposal 1 or Proposal 2.

Although a transmitting side and a receiving side are represented by a User Equipment (UE) and a base station (gNB), respectively, they may identically work on feedback in a D2D or multicast/broadcast environment in which 'multiple point to point' transmission/reception can be performed. A specific signal flow is described below.

Referring to FIG. 2, a UE and BS share a predefined heterogeneous resolution based feedback lookup table with each other [S210]. For the operations of Proposal 1 and Proposal 2, the heterogeneous resolution based feedback lookup table is agreed in advance between the transmitting and receiving sides (e.g., UE and BS). For example, it may be predefined or agreed in a system or the BS may inform the UE (e.g., a feedback transmitting side) of the table through a higher layer signal (e.g., RRC signaling). Or, the BS may inform the UE of the table through common Downlink Control Information (DCI), dedicated DCI, etc.

The BS performs UE grouping for heterogeneous resolution [S210]. For example, the BS may perform UE grouping by variation based UE grouping, random grouping, etc. For the operation of Proposal 1 or Proposal 2, the grouping of the transmitting side should be agreed in advance and recognized by the receiving side. The grouping of the transmitting side may be set different depending on a system environment or updated periodically. For example, it may be set by the following scheme.

Variation Based UE Grouping

A base station allocates a UE, which has a frequently-varying value of periodic or aperiodic feedback, to a lower group (e.g., a high resolution feedback group), which is agreed between the UE and the BS in advance.

For example, a BS may allocate Group 1 to UEs having large mobility (or UEs having CQI feedback varying in comparison to previous feedback), allocate Group 2 to a UE having relatively small mobility, and allocate Group 3 to a UE having fixed mobility without variation. In case that mobility is large, this scheme may advantageously minimize a delay in operating additional feedback.

A base station allocates a UE, which has a frequently-varying value of periodic or aperiodic feedback, to a higher group (e.g., a high resolution feedback group), which is agreed between a transmitting side and a receiving side in advance. For example, a BS may allocate Group 3 to UEs having large mobility (or UEs having CQI feedback varying in comparison to previous feedback), allocate Group 2 to a UE having relatively small mobility, and allocate Group 1 to a UE having fixed mobility without variation. If mobility is large, since feedback information is inaccurate information in performing downlink actually from the perspective of scheduling of the BS, this scheme may be useful in operation without additional feedback.

Random Grouping

It is agreed in advance between a UE and a BS that a resolution group of UEs is randomly allocated.

After performing the UE grouping, the BS sends information (e.g., feedback resolution group indication included) indicating a feedback resolution group to the UE [S230]. Based on the UE grouping information, the BS may give indication of a group index to the UE. Here, the feedback resolution group information including the group index may be sent to the UE in an RRC step by a higher layer signal (e.g., RRC signal). Or, the BS may send the feedback resolution group information including the group index to the UE through DCI and give indication by updating the group index periodically. The BS may designate Group 1 (i.e., conventional feedback) as a default mode. In this case, the group index may not be indicated. If failing to receive the group index indication, the UE recognizes Group 1 (i.e., conventional feedback) as default.

Subsequently, the BS may send a feedback request to the UE [S240]. Since the feedback request is an optional action, the UE does not need to send feedback in response to the feedback request from the BS only.

The UE selects a feedback index according to a group rule allocated in a heterogeneous resolution based feedback lookup table [S250]. Namely, the UE selects a feedback index according to a feedback rule (Proposal 1 or Proposal 2) of a corresponding group in the heterogeneous resolution based feedback lookup table based on the indicated group index. If failing to receive the group index indication, the UE recognizes Group 1 (i.e., conventional feedback) as default and selects a feedback index.

The UE may encode a bit expression corresponding to the selected feedback index and then send it to the BS through a feedback field, a feedback channel, and the like [S260]. In doing so, since a feedback bit amount may be different per group, a format of the feedback field or channel may be different. For example, the UE may send feedback through CQI xPUCCH or send feedback through a different xPUCCH format according to a feedback bit amount. For example, a different feedback channel format may be defined according to a group as follows.

A UE corresponding to Group 1 having a conventional resolution generates (or codes) CQI 4 bits into coded bit 20 bits, multiplexes it with ACK/NACK 1 bit, and sends the multiplexed information through xPUCCH format A.

A UE corresponding to Group 2 having a lower resolution generates (or codes) CQI 3 bits into coded bit 15 bits, multiplexes it with ACK/NACK 6 bits, and sends the multiplexed information through xPUCCH format B.

A UE corresponding to Group 3 having a lower resolution generates (or codes) CQI 2 bits into coded bit 10 bits, multiplexes it with ACK/NACK 11 bits, and sends the multiplexed information through xPUCCH format C.

In the above example, the combination of CQI and ACK/NACK may be set differently depending on a channel coding scheme used for PUCCH channel coding, a basis sequence, or a multiplexing scheme. Or, transmission is performed through a feedback field or a feedback channel and a coding rate is set different according to a group, whereby a coding gain may be set different. Or, a feedback field in a different size is defined on xPUSCH according to a group and a code rate of a data transmission region except the feedback field is differentiated, whereby reliability of transmitted data may be secured additionally.

Regarding all the above operations, since a BS is already aware that a UE belongs to which group, the BS may recognize feedback information by varying an interpretation method according to a group in performing decoding. All the above operations are predefined by the BS according to a system environment and agreed between the UE and the BS, whereby how to multiplex data or ACK/NACK with feedback information may be defined.

Having received the feedback information from the UE, the BS performs interpretation on Multi-User (MU) feedback [S270]. By the interpretation method proposed by Proposal 1 or Proposal 2, the BS may interpret heterogeneous resolution based feedback of multiple users. Based on the interpreted result, the BS may determine whether to make a request for additional feedback to the UE.

If making a request for additional feedback to a specific UE according to the BS's determination [S280], the BS may make a request for additional feedback through a unicast channel (e.g., UE-specific DCI). In doing so, an information amount of the additional feedback may be indicated (e.g., indicated as 1 bit or 2 bits). If the additional feedback information amount is not indicated, the UE may recognize the additional feedback amount (e.g., 1 bit) as default.

After receiving the additional feedback request from the BS, the UE may select an additional feedback index through an allocated (or predefined) group rule [S285]. The UE selects a feedback index of a higher resolution group according to an amount of the additional feedback. For example, if a UE corresponding to Group 2 receives a request for additional feedback 1 bit, the UE selects an additional feedback index with a resolution corresponding to Group 1. For example, as an index 1.5 of Group 2 is connected to an index 1 or 2 of Group 1, 0 means an index 1 and 1 means an index 2.

The UE may encode a bit expression corresponding to the selected additional feedback index and then send it to the BS through an additional feedback field, an additional feedback channel or the like [S290]. In this case, since an amount of feedback bit may be different per additional feedback information amount, a format of the feedback field or channel may be different. For example, the UE may transmit additional feedback through xPUCCH and transmit it through an xPUCCH format different according to an additional feedback bit amount. The additional feedback may differ from the initial feedback of S260 in format (or, a feedback format may be agreed by being predefined in a manner similar to S260). Or, the UE may transmit additional feedback through the same feedback field, the same feedback channel or the like in a manner of setting a code rate differently according to an additional feedback information amount or setting a coding gain differently. Or, the UE may define a feedback field of a different size on xPUSCH according to an additional feedback information amount and differentiate a code rate of a data transmission region except the feedback field, thereby securing reliability of transmission data additionally.

The above-described xPUCCH and xPUSCH are examples to represent a physical uplink control channel and a physical uplink share channel (or a physical uplink data channel) only and are non-limited by the expressions of xPUCCH and xPUSCH, respectively.

After receiving the additional feedback from the UE, the BS may interpret heterogeneous resolution based feedbacks of multiple users by the interpretation method proposed in Proposal 1 or Proposal 2 in a manner of combining the feedback information received in S260 and the information fed back in S290 [S295]. As described above, the operations in S280 to S295 are optional and may operate adaptively according to a system environment.

FIG. 2 is a diagram showing an example of a whole signal flow between transmitting and receiving sides for an operation of Proposal 1 or Proposal 2 according to the present disclosure. A procedure from the perspective of operations of a UE and a BS according to proposals of the present disclosure is described below.

Figure 3:
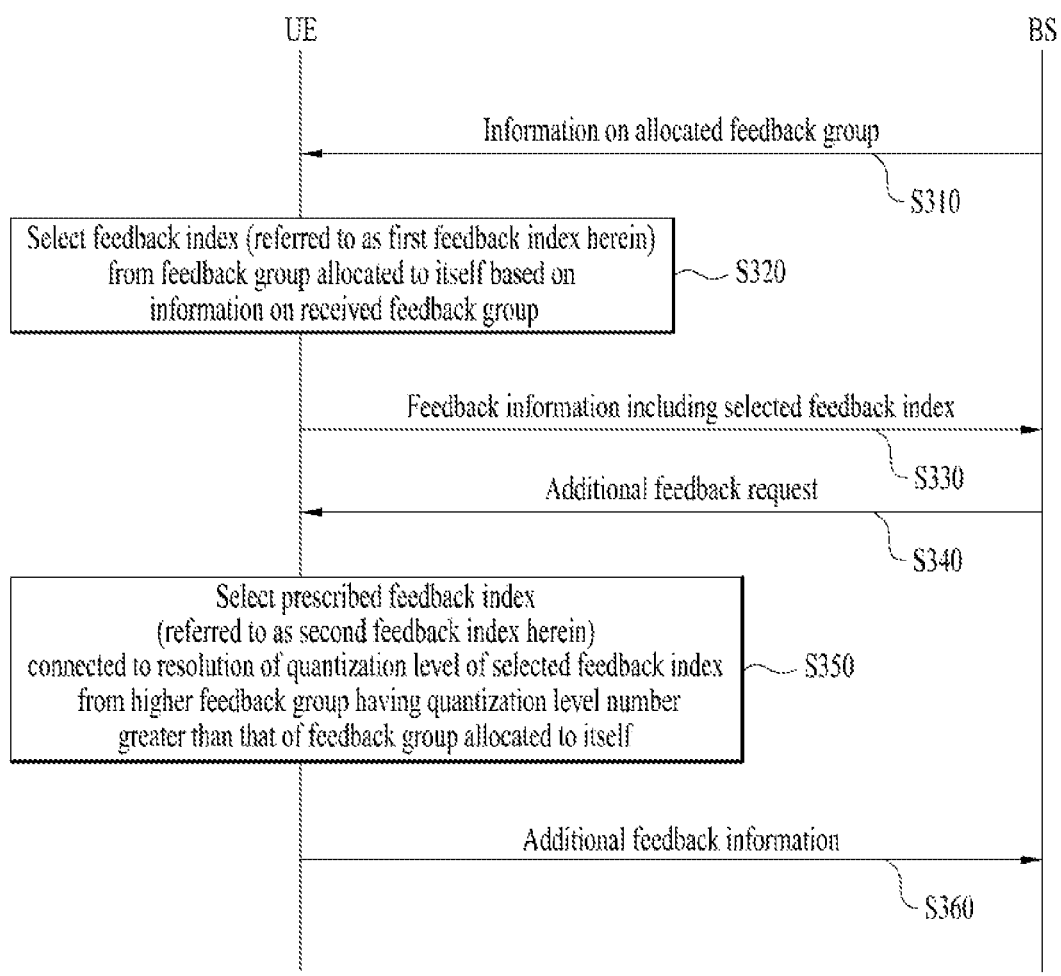
FIG. 3 is a diagram showing an example of a procedure of operations according to the proposals of the present disclosure from the perspective of one transmitting side (UE).

Procedure of Operations of a Transmitting Side (UE) According to Proposals of the Present Disclosure FIG. 3 is a diagram showing an example of a procedure of operations according to the proposals of the present disclosure from the perspective of one transmitting side (UE).

Referring to FIG. 3, a UE may receive information on a feedback group allocated to the UE in a predefined feedback table from a BS [S310]. Based on the received information on the feedback group, the UE may select a feedback index (referred to as a first feedback index herein) from the feedback group allocated to itself [S320]. Thereafter, the UE may send feedback information including the selected first feedback index to the BS [S330]. Here, as described above, the predefined feedback table includes a plurality of feedback groups and each of a plurality of the feedback groups in the feedback table may include a prescribed number of feedback indexes. Each of a plurality of the feedback groups in the feedback table may be set to differ from each other in a resolution of quantization levels for the feedback information. Each of the feedback groups in the predefined feedback table may have a different number of quantization levels. For example, in Table 11, the number of quantization levels of group 1 (i.e., feedback group 1) is set to 16 and the number of quantization levels of group 2_1 is set to 8.

When the UE selects the feedback index in S320, the UE may select the feedback index from the feedback group based on a received SNR for a signal received from the BS. The UE may receive an additional feedback request from the BS in some cases [S340]. Based on the additional feedback request, the UE may select a prescribed feedback index (referred to as a second feedback index herein) connected to a resolution of quantization levels owned by the selected feedback index from a higher feedback group having the quantization level number greater than that of the feedback group allocated to itself [S350]. And, the UE may transmit additional feedback information including the feedback index (referred to as a second feedback index herein) selected from the higher feedback group to the BS [S360]. Here, the feedback information includes Channel Quality Information (CQI) and the feedback index may include a CQI index.

Figure 4:
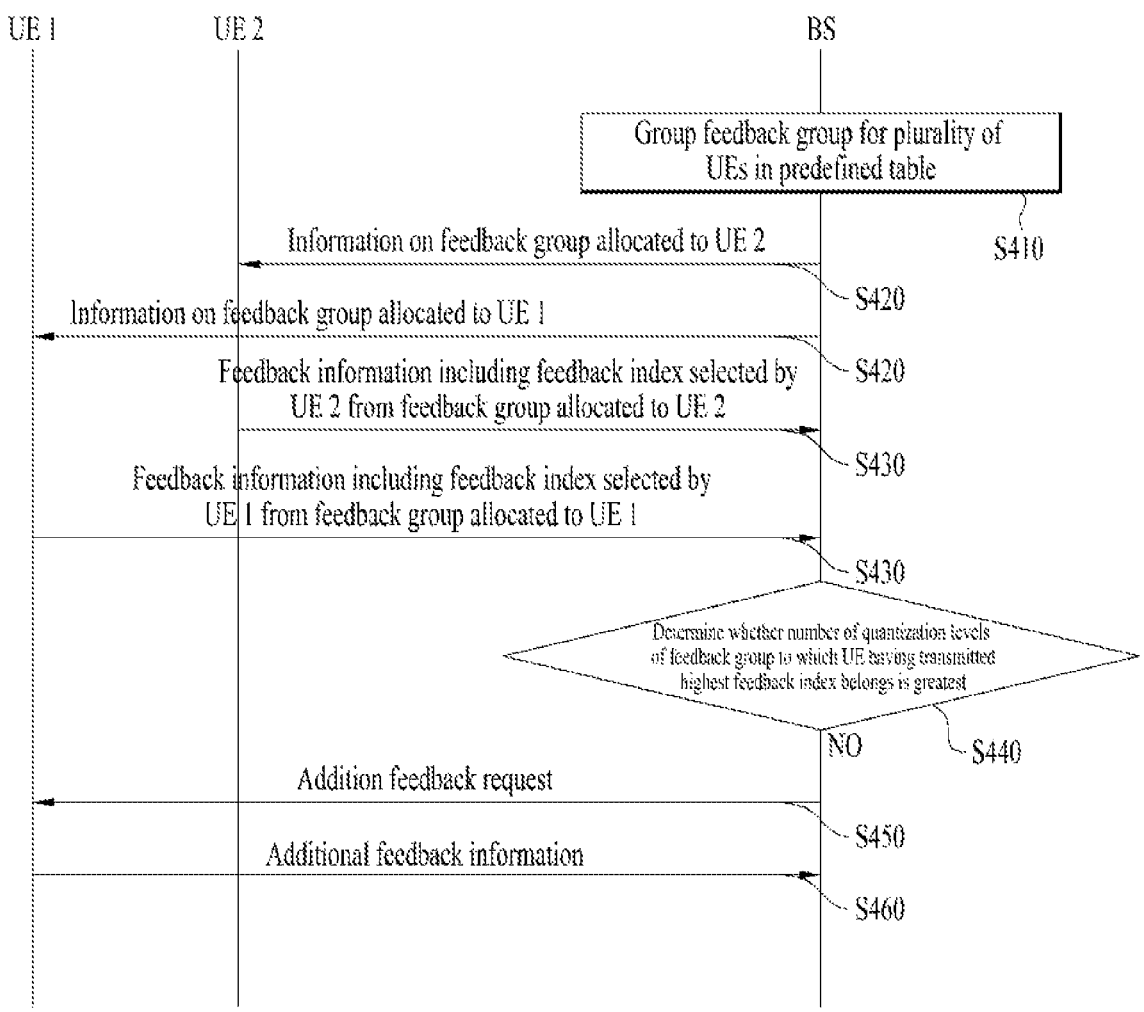
FIG. 4 is a diagram showing an example of a procedure of operations according to the proposals of the present disclosure from the perspective of a receiving side (BS).

Procedure of Operations of a Receiving Side (BS) According to Proposals of the Present Disclosure FIG. 4 is a diagram showing an example of a procedure of operations according to the proposals of the present disclosure from the perspective of a receiving side (BS).

Referring to FIG. 4, a BS may perform grouping on each feedback group in a feedback table predefined for a plurality of UEs (e.g., UE 1 and UE 2 are assumed only for example in FIG. 4) [S410]. Based on the grouping, the BS may transmit information on a feedback group allocated to each of a plurality of the UEs to each of a plurality of the UEs [S420]. The BS may receive feedback information including a feedback index selected from each of a plurality of the UEs [S430]. Here, the predefined feedback table includes a plurality of feedback groups, each of a plurality of the feedback groups in the predefined feedback table includes a prescribed number of feedback indexes, and each of a plurality of the feedback groups in the predefined table may have a differently-set resolution of quantization levels for the feedback information.

The BS selects a UE having sent a highest feedback index based on the feedback information received from each of a plurality of the UEs and may determine whether the selected UE belongs to a feedback group having the greatest quantization level number [S440]. If the selected UE is a UE not belonging to the feedback group having the greatest quantization level number, the BS may send an additional feedback request to the UE [S450]. For example, although it is determined that the UE 1 has sent the highest feedback index like FIG. 4, if the feedback group allocated to the UE 1 is not the feedback group (e.g., Group 1 in Table 11) having the greatest quantization level number, the BS may send an additional feedback request signal to make a request for an additional feedback transmission to the UE 1 [S450]. Thereafter, the BS may receive additional feedback information from the UE 1 [S460].

Here, the feedback groups in the predefined table may have different quantization level numbers, respectively. And, the grouping in S410 may be performed based on an extent that the feedback information varies for each of a plurality of the UEs. The feedback information includes Channel Quality Information (CQI) and the feedback index may include a CQI index.

Figure 5:
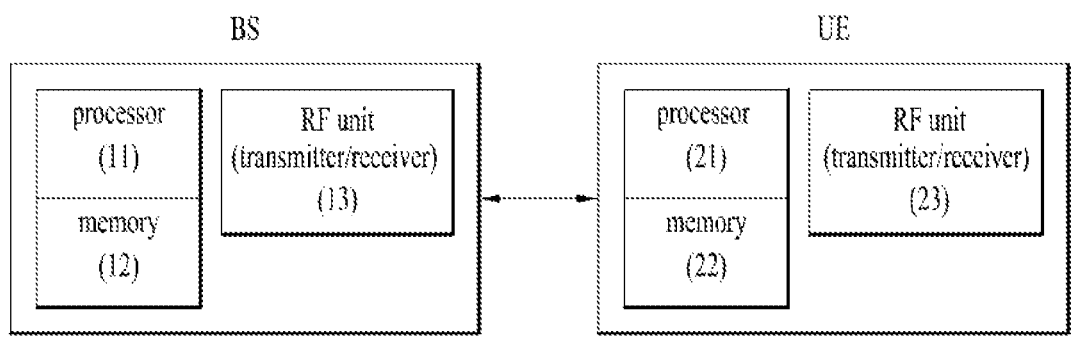
FIG. 5 is a block diagram showing an example of a user equipment performing a procedure of a transmitting side (UE) and a base station performing a procedure of a receiving side (BS).

FIG. 5 is a block diagram showing an example of a user equipment performing a procedure of a transmitting side (UE) and a base station performing a procedure of a receiving side (BS).

A UE Performing a Procedure of a Transmitting Side (UE) According to Proposals of the Present Disclosure Referring to FIG. 5, a receiver 23 of a UE may receive information on a feedback group allocated to the UE in a predefined feedback table from a BS. Based on the received information on the feedback group, a processor 21 of the UE may select a feedback index (referred to as a first feedback index herein) from the feedback group allocated to itself]. Thereafter, a transmitter 23 of the UE may send feedback information including the selected first feedback index to the BS. Here, as described above, the predefined feedback table includes a plurality of feedback groups and each of a plurality of the feedback groups in the feedback table may include a prescribed number of feedback indexes. Each of a plurality of the feedback groups in the feedback table may be set to differ from each other in a resolution of quantization levels for the feedback information. Each of the feedback groups in the predefined feedback table may have a different number of quantization levels. For example, in Table 11, the number of quantization levels of group 1 (i.e., feedback group 1) is set to 16 and the number of quantization levels of group 2_1 is set to 8.

When the processor 21 of the UE selects the feedback index in S320, the UE may select the feedback index from the feedback group based on a received SNR for a signal received from the BS. The receiver 23 of the UE may receive an additional feedback request from the BS in some cases. Based on the additional feedback request, the processor 21 of the UE may select a prescribed feedback index (referred to as a second feedback index herein) connected to a resolution of quantization levels owned by the selected feedback index from a higher feedback group having the quantization level number greater than that of the feedback group allocated to itself. And, the transmitter 23 of the UE may transmit additional feedback information including the feedback index (referred to as a second feedback index herein) selected from the higher feedback group to the BS.

Here, the feedback information includes Channel Quality Information (CQI) and the feedback index may include a CQI index.

A BS Performing a Procedure of a Receiving Side (BS) According to Proposals of the Present Disclosure Referring to FIG. 5, a processor 21 of a BS may perform grouping on each feedback group in a feedback table predefined for a plurality of UEs (e.g., UE 1 and UE 2 are assumed only for example in FIG. 4). Based on the grouping, a transmitter 13 of the BS may transmit information on a feedback group allocated to each of a plurality of the UEs to each of a plurality of the UEs. A receiver 13 of the BS may receive feedback information including a feedback index selected from each of a plurality of the UEs [S430]. Here, the predefined feedback table includes a plurality of feedback groups, each of a plurality of the feedback groups in the predefined feedback table includes a prescribed number of feedback indexes, and each of a plurality of the feedback groups in the predefined table may have a differently-set resolution of quantization levels for the feedback information.

The processor 11 of the BS selects a UE having sent a highest feedback index based on the feedback information received from each of a plurality of the UEs and may determine whether the selected UE belongs to a feedback group having the greatest quantization level number. If the selected UE is a UE not belonging to the feedback group having the greatest quantization level number, the transmitter 13 of the BS may send an additional feedback request to the UE. For example, although it is determined that the UE 1 has sent the highest feedback index like FIG. 4, if the feedback group allocated to the UE 1 is not the feedback group (e.g., Group 1 in Table 11) having the greatest quantization level number, the transmitter 13 of the BS may send an additional feedback request signal to make a request for an additional feedback transmission to the UE 1 [S450]. Thereafter, the receiver 13 of the BS may receive additional feedback information from the UE 1.

Here, the feedback groups in the predefined table may have different quantization level numbers, respectively. And, the grouping in S410 may be performed based on an extent that the feedback information varies for each of a plurality of the UEs. The feedback information includes Channel Quality Information (CQI) and the feedback index may include a CQI index.

Although a transmitting side and a receiving side are described as a User Equipment (UE) and a base station (gNB), respectively, they are applicable to all systems that use a multi-user access schemes such as DL Link, Machine Type Communication (MTC), Device-to-Device (D2D), Vehicle-to-Everything (V2X) Link, Multi-cast/Broadcast, etc. For example, in multicast/broadcast, in order to check minimum QoS from the perspective of size comparison, a receiving side may vary an interpretation method from the perspective of minimum. In the present disclosure, for clarity of description, CQI feedback is exemplarily described from the perspective of the legacy LTE or 5G NR system, it is applicable to all communication systems that use a feedback scheme for the purpose of size comparison based on quantization between transmitting and receiving sides.

As described above, according to an embodiment of the present disclosure, by performing feedbacks of multiple UEs based on heterogeneous resolution, a feedback information amount can be reduced.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method of transmitting and receiving feedback information and apparatus therefor are industrially applicable to various communication systems such as 3GPP LTE-A system, 5G system, etc.

What is claimed is:

1. A method of transmitting feedback information by a user equipment, the method comprising:
receiving information on a feedback group allocated to the user equipment in a predefined feedback table from a base station;
selecting a first feedback index from the allocated feedback group; and
transmitting feedback information including the selected first feedback index to the base station,
wherein the feedback table includes a plurality of feedback groups,
wherein each of a plurality of the feedback groups in the feedback table includes a prescribed number of feedback indexes, and
wherein a plurality of the feedback groups in the feedback table are set to differ from each other in a resolution of quantization levels for the feedback information.

2. The method of claim 1, wherein the selecting the feedback index comprises selecting the feedback index from the feedback group based on a received Signal-to-Noise Ratio (SNR) for a signal received from the base station.

3. The method of claim 1, wherein the feedback groups in the feedback table have different quantization level numbers, respectively.

4. The method of claim 1, further comprising:
receiving an additional feedback request from the base station;
selecting a prescribed second feedback index connected to a resolution of quantization levels owned by the selected feedback index from a higher feedback group having the quantization level number greater than that of the allocated feedback group based on the additional feedback request; and transmitting additional feedback information including the second feedback index selected from the higher feedback group to the base station.

5. The method of claim 1, wherein the feedback information includes Channel Quality Information (CQI) and wherein the feedback index includes a CQI index.

6. A method of receiving feedback information by a base station, the method comprising:

grouping feedback groups in a feedback table predefined for a plurality of user equipments;

transmitting information on the feedback groups allocated to a plurality of the user equipments to a plurality of the user equipments based on the grouping, respectively; and receiving feedback information including a selected feedback index from each of a plurality of the user equipments, wherein the feedback table includes a plurality of feedback groups, wherein each of a plurality of the feedback groups in the feedback table includes a prescribed number of feedback indexes, and wherein a plurality of the feedback groups in the feedback table are set to differ from each other in a resolution of quantization levels for the feedback information.

7. The method of claim 6, further comprising:

selecting a user equipment having transmitted a highest feedback index based on the feedback information received from each of a plurality of the user equipments;

if the selected user equipment does not belong to a feedback group having a greatest quantization level number, transmitting an additional feedback request to the user equipment; and receiving additional feedback information from the selected user equipment.

8. The method of claim 6, wherein the feedback groups in the feedback table have different quantization level numbers, respectively.

9. The method of claim 6, wherein the grouping is performed based on an extent that the feedback information varies for each of a plurality of the user equipments.

10. The method of claim 6, wherein the feedback information includes Channel Quality Information (CQI) and wherein the feedback index includes a CQI index.

11. A user equipment transmitting feedback information, the user equipment comprising:

a receiver receiving information on a feedback group allocated to the user equipment in a predefined feedback table from a base station;

a processor selecting a first feedback index from the allocated feedback group; and a transmitter transmitting feedback information including the selected first feedback index to the base station, wherein the feedback table includes a plurality of feedback groups, wherein each of a plurality of the feedback groups in the feedback table includes a prescribed number of feedback indexes, and wherein a plurality of the feedback groups in the feedback table are set to differ from each other in a resolution of quantization levels for the feedback information.

12. The user equipment of claim 11, wherein the processor selects the feedback index from the feedback group based on a received Signal-to-Noise Ratio (SNR) for a signal received from the base station.

13. The user equipment of claim 11, wherein the receiver receives an additional feedback request from the base station, wherein the processor selects a prescribed second feedback index connected to a resolution of quantization levels owned by the selected feedback index from a higher feedback group having the quantization level number greater than that of the allocated feedback group based on the additional feedback request, and wherein the transmitter transmits additional feedback information including the second feedback index selected from the higher feedback group to the base station.

14. The user equipment of claim 11, wherein the user equipment is capable of communicating with at least one of another user equipment, a user equipment related to an autonomous driving vehicle, the base station or a network.

15. A base station receiving feedback information, the base station comprising:

a processor grouping feedback groups in a feedback table predefined for a plurality of user equipments;

a transmitter transmitting information on the feedback groups allocated to a plurality of the user equipments to a plurality of the user equipments based on the grouping, respectively; and a receiver receiving feedback information including a selected feedback index from each of a plurality of the user equipments, wherein the feedback table includes a plurality of feedback groups, wherein each of a plurality of the feedback groups in the feedback table includes a prescribed number of feedback indexes, and wherein a plurality of the feedback groups in the feedback table are set to differ from each other in a resolution of quantization levels for the feedback information.

16. The base station of claim 15, wherein the processor selects a user equipment having transmitted a highest feedback index based on the feedback information received from each of a plurality of the user equipments, wherein if the selected user equipment does not belong to a feedback group having a greatest quantization level number, the transmitter transmits an additional feedback request to the user equipment, and wherein the receiver receives additional feedback information from the selected user equipment.

* * * * *